United States Patent
Mertens

(10) Patent No.: US 8,808,448 B2
(45) Date of Patent: Aug. 19, 2014

(54) MINERAL HEAT-INSULATION MATERIAL

(75) Inventor: Antonius Mertens, Fischbeck (DE)

(73) Assignee: Tanja Thomas, Fischbeck (DE)

( * ) Notice: Subject to any disclaimer, the term of this patent is extended or adjusted under 35 U.S.C. 154(b) by 446 days.

(21) Appl. No.: 12/722,608

(22) Filed: Mar. 12, 2010

(65) Prior Publication Data

US 2011/0223338 A1 Sep. 15, 2011

(51) Int. Cl.
- *C04B 9/04* (2006.01)
- *C04B 11/00* (2006.01)
- *C04B 28/14* (2006.01)
- *C04B 16/08* (2006.01)
- *C04B 20/00* (2006.01)
- *C04B 38/00* (2006.01)
- *C04B 7/00* (2006.01)
- *C04B 14/40* (2006.01)
- C04B 111/00 (2006.01)
- C08K 3/26 (2006.01)
- C08K 5/09 (2006.01)
- *C04B 111/28* (2006.01)
- C08K 3/08 (2006.01)
- C08K 3/30 (2006.01)

(52) U.S. Cl.
CPC ..... *C04B 28/146* (2013.01); C04B 2111/00112 (2013.01); C08K 3/26 (2013.01); C08K 5/09 (2013.01); *C04B 28/147* (2013.01); C04B 2111/28 (2013.01); C08K 3/08 (2013.01); C08K 3/30 (2013.01); C04B 2111/00482 (2013.01)
USPC .............................. 106/680; 106/701; 106/772

(58) Field of Classification Search
USPC .................................................. 106/680, 772
See application file for complete search history.

(56) References Cited

U.S. PATENT DOCUMENTS

| 3,442,672 | A | * | 5/1969 | Kampf | 106/641 |
| 6,162,839 | A | * | 12/2000 | Klauck et al. | 521/83 |
| 2002/0161071 | A1 | * | 10/2002 | Mills et al. | 524/2 |
| 2005/0241541 | A1 | * | 11/2005 | Hohn et al. | 106/805 |
| 2006/0048684 | A1 | * | 3/2006 | Bonetto et al. | 106/772 |

FOREIGN PATENT DOCUMENTS

| DE | 3743855 | | 5/1989 |
| DE | 3806854 | | 2/1991 |
| DE | 19651448 | | 6/1997 |
| DE | 19616734 | | 11/1997 |
| EP | 0688261 | A1 * | 12/1995 |
| WO | WO 2006012680 | A1 * | 2/2006 |

OTHER PUBLICATIONS

Bayer, R. Lutz, H. "Dry Mortars". Ullmann's Encyclopedia of Industrial Chemistry. 2003 Electronic Release [Retrieved on Aug. 30, 2012]. Retrieved from http://www.mbam.org.my/mbam/images/MBJ1QO6(pdf)/@DryMortar.pdf.*

* cited by examiner

*Primary Examiner* — Kaj K Olsen
*Assistant Examiner* — Karam Hijji
(74) *Attorney, Agent, or Firm* — Greer, Burns & Crain, Ltd.

(57) ABSTRACT

The method for applying a heat insulation layer to an area is characterized in that alpha-hemihydrate or beta-gypsum or lime-alpha-hemihydrate or a mixture thereof is mixed as hydraulic binder with a pore former consisting of aluminum powder, mixed with ground limestone, and citric acid with addition of water and is cast in liquid or pasty form onto the area. The mixture has a pH of 11.8 or more. The constituents are preferably mixed on site, namely in such a consistency that the mixture is self-leveling. Placement on the laying site can e.g. be carried out by means of a floor screed pump. The material expands to the desired total thickness, yielding a homogeneous insulation layer of uniform thickness and quality and of high strength that will reach its high final strength after about 24 hours. The material can also be applied in a pasty consistency to a wall.

15 Claims, No Drawings

MINERAL HEAT-INSULATION MATERIAL

The present invention relates to a mineral heat-insulation material which is e.g. usable as an interior wall insulation, roof insulation, floor insulation, façade insulation, as an insulation for passages leading, for example, to basement garages, and for filling cavities with heat-insulating effect, and to the formation of a load-bearing heat insulation underneath concrete constructions in building and civil engineering.

It is known that a mixture is prepared from calcium silicate hydrates, lime, sand, cement, water and pore formers, the mixture being cast into large blocks, heated to about 190° C. and cut into stone slabs after cooling by means of autoclaves. This requires a considerable amount of energy and also has the drawback that with many applications it is not possible to cover the whole area prone to heat loss by laying heat-insulating panels because some parts of the area are often concealed, for instance, by vent channels or cable/pipes, etc. In the case of a reinforced concrete floor it is normally only about 85% of the area that is adapted to be covered by heat insulating panels.

EP 0 490 160 A1 discloses a process for manufacturing gypsum building materials, in which alpha-hemihydrate with a Blaine specific surface area is mixed with beta-hemihydrate and a prefabricated surfactant foam is added to said mixture, which foam is prepared by means of a foam gun at a specific water/surfactant/air ratio and with a defined foaming length, which is meant to yield a substantially uniform pore size. The suspension is then subjected to a forming process, particularly in the form of wall panels that are then introduced into an autoclave where they are exposed to a saturated vapor treatment and to a temperature of up to 200° C.

It is the object of the present invention to provide a better solution for these problems.

This object is achieved according to the invention by the features of patent claims 1 and 7.

Advantageous developments of the invention are characterized in the dependent claims.

According to the invention the heat insulation layer contains the constituents alpha-hemihydrate or beta-gypsum or lime-alpha-hemihydrate or a mixture of two or three of said constituents as hydraulic binder, pore formers of aluminum powder and ground limestone, which are blended with one another, lime and a retarding agent such as citric acid. Like the other constituents, the citric acid is added in a ground state.

The lime is added in such an amount that according to the invention the finished mixture has a pH of 11.8 or more. Without lime the pH would normally be 8 to 10. Due to the alkaline environment the aluminum powder reacts to form aluminate and hydrogen, which loosens the binder mass, and the resulting heat development creates water vapor which will then loosen the solid structure and leave the pores. The pore structure is very uniform. The heat insulation material is thus open to vapor diffusion.

The citric acid in combination with the other constituents has the advantage that the compressive strength is not decreasing, but always remains the same. By contrast, in conventional mineral heat-insulation materials the compressive strength is decreasing by about 5-8%. The compressive strength is maintained in the mixture according to the invention.

The essential constituents of the mixture are preferably composed as follows:

| | |
|---|---|
| Binder | 80-90% by wt. of the total solids content |
| Aluminum-limestone powder in the mixture of 90% limestone powder + 10% aluminum | 5-14.95% by wt. of the total solids content |
| Lime | 0.5-5.0% by wt. of the total solids content |
| Citric acid | about 0.05% by wt. of the total solids content |

The water/binder factor is preferably 0.35-0.65%.

The constituents of the mineral heat-insulation materials are preferably mixed on site with addition of water and are cast in liquid (or paste-like) form onto the substrate. The mixture is preferably of such a consistency that it is self-leveling.

The heat-insulation material mixture is preferably cast at a thickness of between 1 cm and 2 cm onto the substrate, in which process the introduced mixture does not require any considerable leveling and screeding work. Placement on the laying site can e.g. be carried out with floor screed pumps. The material will then expand at the above-indicated thickness of 2 cm of the base material to a total thickness of about 51 mm, thereby yielding a homogeneous insulation layer of equal thickness and quality and of high strength.

The cast insulation material will be hard enough to be walked on after about 60 min and will reach its high final strength after about 24 hours.

The energy input for forming the thermal insulation layer is only about 1% of the energy input required e.g. by porous concrete stones.

The chemical process in the heat insulation material according to the invention is as follows: the aluminum expands at a pH of 11.8 or more and generates pores while forming hydrogen, the pores being present in the structure in a stable state after drying. These pores are filled with air so that a highly efficiently heat insulation material is obtained because air is one of the poorest heat conductors. The finished insulation layer does not evaporate and is non-combustible (Fuel Class A1).

Moreover, the heat insulation material according to the invention is 100% recyclable. If the material has to be removed again, it can be remixed with water after renewed grinding with an amount of hydraulic binder and with addition of pore formers, resulting in the same product again.

The mineral insulating material according to the invention can be cast in the retrofitting of existing buildings onto wooden floors that statically require a small weight. It is also highly suited as impact sound insulation material e.g. in the case of joist ceilings having a low weight of their own. As a liquid, self-leveling insulation, each spot of the floor area to be insulated can be reached. The invention also provides for a fast and easy insulation of a wall area. While a wall is being insulated, one can proceed section wise from the bottom to the top with a pasty base material for instance in strips of a height of 1.5 m.

It is also possible to prefabricate panels of any desired dimension as façade insulation panels for direct adhesive bonding by means of a commercially available adhesive. This façade insulation has the advantage that a good insulation is achieved. The insulating system permits the passage of solar energy into the massive building material and is simultaneously open to vapor diffusion for the possible transportation of moisture. This prevents the formation of mold within the building. Thus the temperature equalization between indoor air and outdoor temperature is also called instationary U-value, which ensures a balanced room climate while guaranteeing good heat insulation. Contrary to the Energy Saving Directive, it is possible with this system to include the solar gains in the loss and profit calculation.

It should be noted that the invention is not limited to the above-described embodiments. Rather, all of the disclosed features can be combined individually with one another in any desired way.

The invention claimed is:

1. A method of applying a heat insulation layer to a surface, comprising
    providing a mixture containing:
        a hydraulic bonding agent comprising 80-90 wt. % of total solid materials of the mixture, the hydraulic bonding agent containing alpha-hemihydrate, beta-gypsum, or a mixture of alpha-hemihydrate and beta gypsum,
        an aluminum powder-limestone flour mixture comprising 5-14.95 wt. % of the total solid materials, the aluminum powder-limestone flour mixture having a ratio of about 90% limestone flour to about 10% aluminum powder,
        lime comprising 0.5-5.0 wt % of the total solid materials,
        citric acid comprising about 0.05 wt % of the total solid materials, and
        water,
        wherein the mixture has a pH of 11.8 or more; and
    applying the mixture in liquid or paste form onto the surface, wherein a water/bonding agent factor is about 0.35-0.65%.

2. The method according to claim 1, wherein the surface is a floor surface.

3. The method according to claim 1, wherein the surface is a wall surface and that the mixture is of a pasty consistency.

4. The method according to claim 1, wherein the providing comprises mixing the mixture at a place of installation.

5. The method according to claim 1, wherein the provided mixture is of such a consistency that it is self-leveling.

6. The method according to claim 1, wherein the applied mixture introduces a heat insulation layer to the surface, and wherein the introduced heat insulation layer hardens to reach its final strength after about 24 hours.

7. The method according to claim 1, wherein the mixture is 100% recyclable.

8. A method of providing a heat insulation layer for a surface, comprising:
    mixing a bonding agent, a pore former, lime, and citric acid with an addition of water to provide a mixture having a pH of 11.8 or more, the bonding agent comprising 80-90 wt. % of total solid materials, the pore former comprising 5-14.95 wt. % of the total solid materials, the lime comprising 0.5-5.0 wt. % of the total solid materials, and the citric acid comprising about 0.05 wt. % of the total solid materials; and
    applying the mixture in liquid or paste form onto the surface to provide the heat insulation layer, wherein a water/bonding agent factor is about 0.35-0.65%;
    wherein the hydraulic bonding agent contains alpha-hemihydrate, beta-gypsum, or a mixture of alpha-hemihydrate and beta gypsum; and
    wherein the pore former comprises blended aluminum powder and limestone flour having a ratio of about 90% limestone flour to about 10% aluminum powder.

9. The method according to claim 8, wherein said mixing takes place at a place of use.

10. The method according to claim 8, further comprising:
    allowing the heat insulation layer to harden, wherein the heat insulation layer hardens to its final strength after about 24 hours.

11. The method according to claim 8, wherein the surface is a floor surface.

12. The method according to claim 8, wherein the surface is a wall surface.

13. The method according to claim 6, wherein the heat insulation layer includes a highly uniform pore structure; and
    wherein the heat insulation layer is open to vapor diffusion.

14. The method according to claim 1, wherein after applying the mixture, the aluminum powder reacts to form aluminate and hydrogen, wherein heat is developed; and
    wherein the heat development creates water vapor, the water vapor loosening a solid structure of the mixture and leaving pores in the solid structure, the pores being filled with air.

15. The method according to claim 6, wherein the final strength in the applied mixture is maintained after hardening.

* * * * *